United States Patent
Bart et al.

(10) Patent No.: US 9,781,348 B1
(45) Date of Patent: Oct. 3, 2017

(54) AUTOMATIC ORIENTATION OF A CAMERA IN RESPONSE TO SENSOR DATA

(71) Applicant: Alarm.com Incorporated, Vienna, VA (US)

(72) Inventors: Gary Franklin Bart, Weston, FL (US); Mehmet Erdal Caglayan, Fort Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 238 days.

(21) Appl. No.: 14/930,401

(22) Filed: Nov. 2, 2015

Related U.S. Application Data

(60) Provisional application No. 62/074,563, filed on Nov. 3, 2014.

(51) Int. Cl.
| | | |
|---|---|---|
| *H04N 7/18* | (2006.01) | |
| *G06K 9/00* | (2006.01) | |
| *H04N 5/232* | (2006.01) | |
| *G08B 13/196* | (2006.01) | |

(52) U.S. Cl.
CPC ... *H04N 5/23296* (2013.01); *G08B 13/19636* (2013.01); *H04N 5/23206* (2013.01); *H04N 5/23216* (2013.01); *H04N 7/183* (2013.01); *H04N 7/188* (2013.01)

(58) Field of Classification Search
CPC .......... H04N 5/23296; H04N 5/23206; H04N 5/23216; G08B 13/19636
See application file for complete search history.

(56) References Cited

U.S. PATENT DOCUMENTS

| | | | | |
|---|---|---|---|---|
| 8,848,057 | B2 * | 9/2014 | Xu | G08B 13/1961 348/143 |
| 9,501,914 | B1 * | 11/2016 | Chen | G08B 13/1966 |
| 9,591,299 | B2 * | 3/2017 | Hess, Jr. | H04N 17/002 |
| 9,628,688 | B2 * | 4/2017 | Martin | H04N 5/2259 |
| 2007/0025723 | A1 * | 2/2007 | Baudisch | G03B 13/02 396/287 |
| 2013/0162760 | A1 * | 6/2013 | Olavi | G03B 5/00 348/36 |

* cited by examiner

*Primary Examiner* — Tsion B Owens
(74) *Attorney, Agent, or Firm* — Fish & Richardson P.C.

(57) ABSTRACT

Movements of a pan and tilt camera may be controlled by reorienting the camera in response to discrete information obtained by the camera from a related but independent device such as a sensor so that the camera can capture video of events of potential interest to a user. Such sensors can respond to multiple stimuli such as, for example, sound, motion, light, pressure, humidity, and/or the like. The cameras can include, for example, pan and tilt and zoom (PTZ) cameras that can be used in monitoring and surveillance operations. For example, the pan and tilt camera can be used as a surveillance camera at a home, business, vacation, or any other property.

20 Claims, 5 Drawing Sheets

AUTOMATIC ORIENTATION OF A CAMERA IN RESPONSE TO SENSOR DATA

CROSS-REFERENCE TO RELATED APPLICATIONS

This application claims the benefit of U.S. Provisional Patent Application No. 62/074,563 filed on Nov. 3, 2014 and entitled "AUTOMATIC ORIENTATION OF A CAMERA IN RESPONSE TO SENSOR DATA," which is incorporated herein by reference in its entirety.

TECHNICAL FIELD

This disclosure relates to camera control.

BACKGROUND

Many people equip homes and businesses cameras for surveillance. The movement of some cameras may be controlled to control a view of the camera. For example, some cameras may pan or tilt.

SUMMARY

Techniques are described for controlling a camera.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Figure 1:
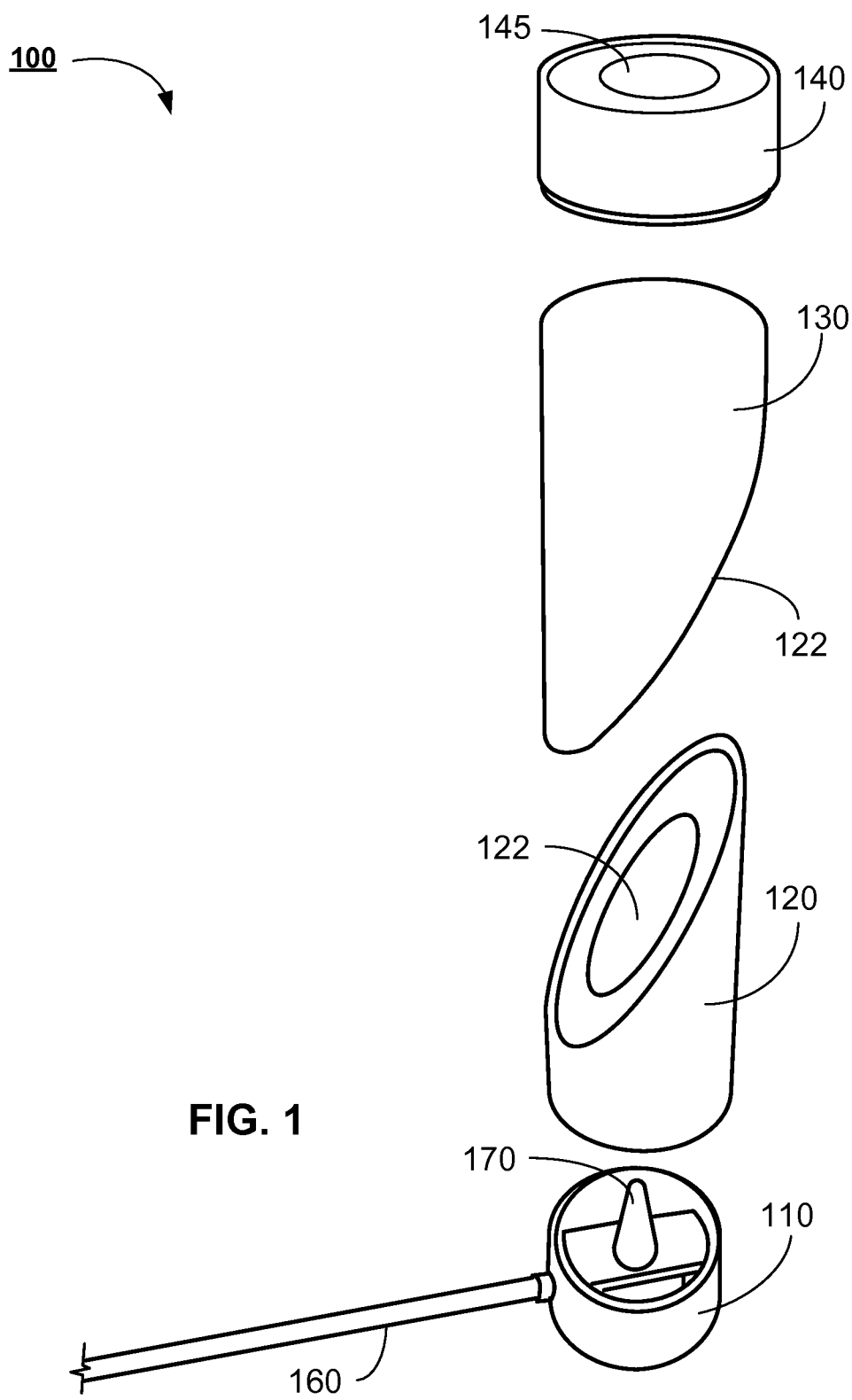
FIG. 1 is a schematic diagram of an exploded view of an example pan and tilt camera.
Figure 2A:
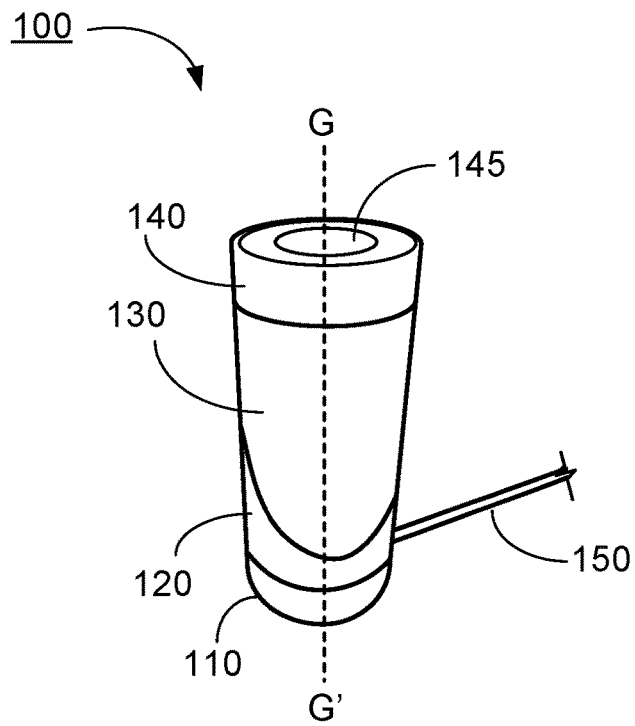
FIGS. 2A, 2B, 2C and 2D are images of the example pan and tilt camera from different orientations.
Figure 2B:
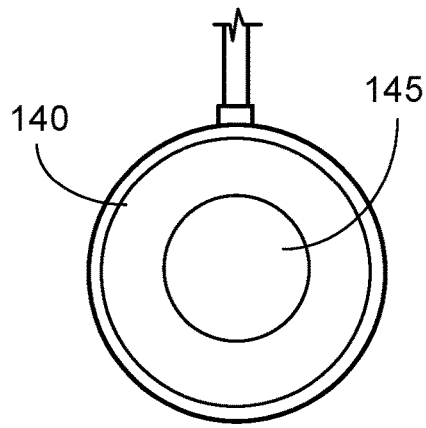
Figure 2C:
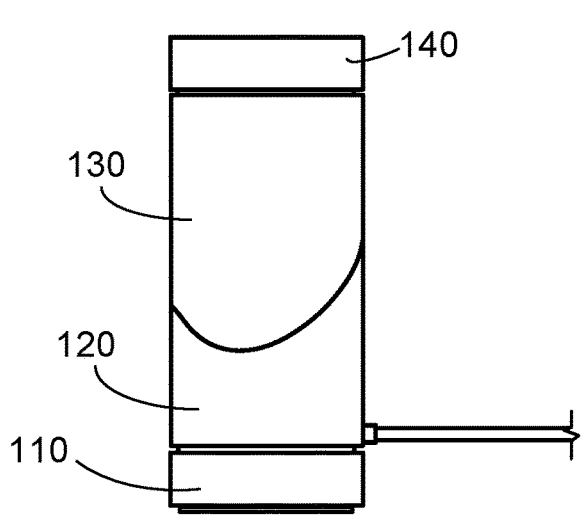
Figure 2D:
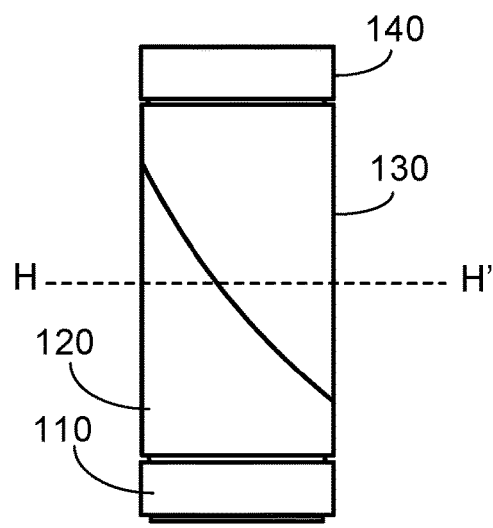

Some embodiments described herein relate generally to methods for remotely controlling the movements of a data acquisition device in response to a sensor data. In particular, but not by way of limitation, some of the embodiments described herein relate to methods and apparatus for remotely controlling the movements of a pan and tilt camera by reorienting the camera in response to discrete information obtained by the camera from a related but independent device such as a sensor so that the camera can capture video of events of potential interest to the user.

Methods and techniques are described herein for controlling the movements of a camera by reorienting the camera in response to discrete information obtained by the camera from a related but independent device such as a sensor so that the camera can capture video of events of potential interest to a user. Such sensors can respond to multiple stimuli such as, for example, sound, motion, light, pressure, humidity, and/or the like. The cameras can include, for example, pan and tilt and zoom (PTZ) cameras that can be used in monitoring and surveillance operations. For example, the pan and tilt camera can be used as a surveillance camera at a home, business, vacation, or any other property. The pan and tilt cameras can perform continuous panning and/or tilting in a set of pre-defined desired directions. Thus, the pan and tilt camera can view an object moving continuously around the camera without the need to reverse pan or tilt directions to return to an initial starting position before continuing to pan or tilt in the original direction. The pan and tilt camera can provide a compact device that is capable of performing surveillance and monitoring operations without the rotational limitations of known cameras.

The methods and system described for controlling the movements of a camera can allow the camera to coordinate its movement in response to an event detected by an external device, such as a sensor that detects motion (e.g., a door opening, a window opening, etc.), using a method whereby the sensor can alert the camera to such an event and a camera control application (e.g., the control "software") can be made aware of the orientation required to aim the angle of view of the camera toward such a sensor. Such orientation of the camera towards the direction of a sensor in response to receiving sensor data can be implemented by a number of methods as described herein.

In some implementations, pan and tilt cameras are IP- or cloud-based devices and transmit video data over networks for a user to view on a remote device such as, for example, a smartphone, a tablet, a laptop computer, etc. In these implementations, to adjust the angle of view of the camera, a camera control application can provide a mechanism whereby desired input co-ordinates included in a control signal can be used to pan or tilt the camera in any particular desired direction.

In some cases, pan and tilt cameras point in one direction and can be reoriented either manually by a user via a camera control application (e.g., software control), or can be programmed to periodically reorient to a pre-defined view. This method, however, does not present a high likelihood for a user to capture an off-screen event of significance (e.g., the off-screen event may be completed by the time a user manually reorients the camera or the off-screen event may be missed if the event does not align with the programmed reorientation of the camera).

In some examples, methods and apparatus control the movement of a camera by orienting the camera towards the location of a sensor in response to receiving data from the sensor so that the camera can capture video of events of potential interest to the user. In this regard, the camera automatically reorients to an event of potential interest, which may allow for improved image capture of off-screen events.

Accordingly, techniques are described for remotely controlling the movements of a data acquisition device in response to sensor data. In particular, but not by way of limitation, some examples described herein relate to methods and apparatus for remotely controlling the movements of a pan and tilt camera by reorienting the camera in response to discrete information obtained by the camera from a related, but independent device, such as a sensor, so that the camera can capture video of events of potential interest to the user.

As used herein, and unless stated otherwise, the terms "pan and tilt camera" and "camera" can be used interchangeably to refer to an image acquisition device that can tilt and rotate along a set of angles to acquire video and static images.

FIG. 1 illustrates an example of a pan and tilt camera 100. The pan and tilt camera 100, as shown, includes an upper portion that includes four outer sections: a base 110, lower body 120, upper body 130, and lens housing 140 that can, in some implementations, cumulatively form a cylindrical structure. The base 110 is also connected to a power cable 160, and features a slip ring 170 for coupling the electrical power supplied by the power cable 160 to the functional components of the camera 100 without the need for a wired connection. The sections of the pan and tilt camera 110-140 (e.g., base, upper and lower body sections, and lens housing) may be formed in any number of materials, such as any plastic, metal, alloy, composite material, ceramic material, or other material. In some implementations, the pan and tilt camera 100 can feature a fixed base 110, where the fixed base 110 is connected to a power cable functioning to provide a power source to the camera 100. The base 110 can be of a cylindrical or disk-like shape, having a flat bottom that enables the pan and tilt camera 100 to be mounted to or sit on a surface such as, for example, a ceiling, wall, roof, window sill, floor, table, etc. Connected to the base 110 is the lower body 120, which is, in turn, connected to the upper body 130. The lower and upper bodies 110-120 are formed such that the two bodies can, in some implementations, appear to form a single cylinder that has been transected at an angle 122. Attached to the upper body 130 is the lens housing 140, which can include the different components that enable the pan and tilt camera 100 to perform monitoring activities. For example, the lens housing 140 can feature one or more sensor devices 145 (e.g., one or more video cameras, still cameras, infrared cameras, night vision cameras, etc.) or other devices capable of capturing static images and/or video from the environment surrounding the pan and tilt camera 100. In some instances, the lens housing 140 can feature other electronics and circuitry required to operate the one or more camera devices. Furthermore, in some implementations, the lens housing 140 can also feature one or more other sensors, such as one or more microphones, motion sensors, contact sensors, light sensors, environmental or monitoring sensors, and/or the like.

The base 110 can be a fixed component of the camera 100, such that the base 110 is stationary while the camera 100 is performing pan or tilt operations. Additionally, the base 110 may feature a fixture configured to connect to a power cable 160 for providing electrical power to the camera 100. For example, the base 110 may feature an outlet or plug that allows a power cable 160 to be connected to the base 110, or a power cable 160 may be permanently connected to the base 110. The base 110 shown in FIG. 1 further features a slip ring 170 that can connect the power connection from the attached power cable 160 to the lower body 120 of the camera. In doing so, the camera 100 can perform continuous rotation about the vertical axis, without limitations caused by twisting or other issues associated with a corded connection from the base 110 to the lower body 120 of the pan and tilt camera 100.

The pan and tilt camera 100 can pan, e.g., rotate horizontally about a vertical axis, based on the lower body 120 rotating in a clockwise or counterclockwise direction with respect to the fixed base 110. The camera 100 can tilt, e.g., move in a direction that is about a horizontal axis, based on the upper body 130 rotating with respect to the lower body 120. Since the upper body 130 and lower body 120 are the transection portions of the cylindrical structure of the camera 100, the upper body 130 can move in an arc-like motion having components in both the vertical and horizontal directions. The lens housing 140 connected to the upper body 130 opposite the lower body 120 includes a sensor device 145 that is capable of capturing static images and/or video from the environment surrounding the pan and tilt camera 100.

FIGS. 2A-2D are images of the pan and tilt camera 100 from different orientations. The pan and tilt camera (or the camera) 100 includes a base 110, lower body 120, upper body 130, and lens housing 140 that can, in some implementations, cumulatively form a cylindrical structure. Referring to FIG. 1 and FIGS. 2A-2D, the cylindrical structure of the camera 100 is transected across its diameter along the vertical axis as represented by the line GG' in FIG. 2A (or perpendicular to the horizontal axis HH') to form the bottom section of the camera that includes the base 110 and the lower body 120. In some implementations, the base 110 may have a height that is approximately twenty percent of the total height of the cylindrical camera structure, with the other eighty percent being accounted by the lower body 120, upper body 130, and lens housing 140 sections. The cylindrical structure of the camera 100 is transected at an angle across its diameter, thereby forming the lower body 120 and upper body 130 of the camera 100. In some implementations, the angle between the horizontal axis HH' and the top of the lower body 120 may be in the range of 45 degrees to 55 degrees, or may be different depending upon the requirements of the application. In operation, the lower body 120 of camera 100 enables the camera 100 to pan, based on the lower body 120 of the camera rotating in a clockwise or counterclockwise fashion about the vertical axis GG'. The pan and tilt camera 100 can also tilt, e.g., move in an arc-like direction about a horizontal axis as represented by the line HH' in FIG. 2D.

Figure 3:
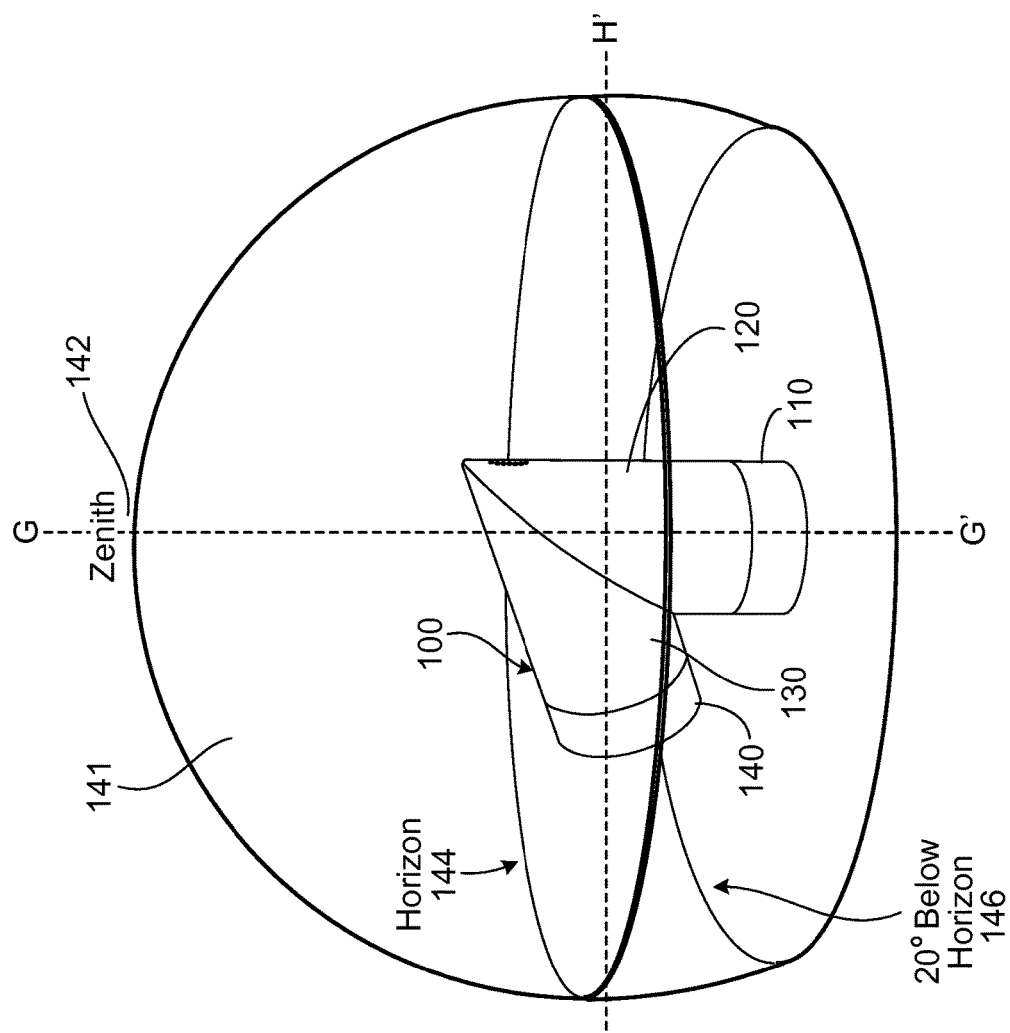
FIG. 3 illustrates an example of the possible fields of view of the pan and tilt camera when the pan and tilt capabilities of the camera are enabled.

FIG. 3 illustrates an example of the possible fields of view of the pan and tilt camera when the pan and tilt capabilities of the camera are enabled. While these illustrations generally describe the capabilities of the pan and tilt camera 100 to monitor various fields of view, the specific fields of view available to the pan and tilt camera 100 according to this description may be dependent upon certain design characteristics of the pan and tilt camera 100. For instance, by changing the angle at which the cylindrical camera structure is transected to form the upper body 130 and lower body 120, the range of the tilt movement of the lens housing 140 may be adjusted.

The range of possible fields of view of the pan and tilt camera 100 may be described by a modified hemisphere 141, such that the possible fields of view of the pan and tilt camera 100 range from the zenith 142 of the modified hemisphere 141 (e.g., along the vertical axis represented by the line GG' passing through the pan and tilt camera 100) to a point 146 below the horizon 144 of the modified hemisphere 141 (e.g., a point below the horizontal axis HH'). The pan and tilt camera 100 is capable of performing imaging at any point along this range from the zenith 142 to the point near or below the horizon 144 and in any direction around the vertical axis GG', that is, the pan and tilt camera 100 can be capable of performing 360 degree imaging at any tilt that is described by the modified hemisphere 141.

FIGS. 2 and 3 illustrate possible fields of view of the pan and tilt camera 100, as well as possible configurations of the pan and tilt camera 100 that enable the camera 100 to achieve those fields of view. While these illustrations generally describe the capabilities of the pan and tilt camera 100 to monitor various fields of view, the specific fields of view available to a particular pan and tilt camera 100 according to this description may be dependent upon the particular design characteristics of the pan and tilt camera 100. The range of possible tilt positions of the camera can be specified based on the angle that the cylindrical body of the pan and tilt camera is transected 122. Generally, a steeper angle (e.g., an angle of fifty five degrees from the horizontal) allows the pan and tilt camera 100 to have a field of view that is further below the horizontal than a shallower angle (e.g., an angle of 45 degrees from the horizontal). For example, as shown in FIG. 3, the body of the cylindrical camera structure is transected at a fifty five degree angle relative to the horizontal axis HH', and is capable of performing tilt movements that range from the zenith 142 of the modified hemisphere 141 to a point that is twenty degrees below the horizontal 146. In contrast, if the cylindrical camera structure were transected at a forty five degree angle, the range of possible tilt movements would be only from the zenith 142 of the modified hemisphere to a point at the horizon 144 (i.e., zero degrees below the horizon) of the modified hemisphere 141.

Figure 4:
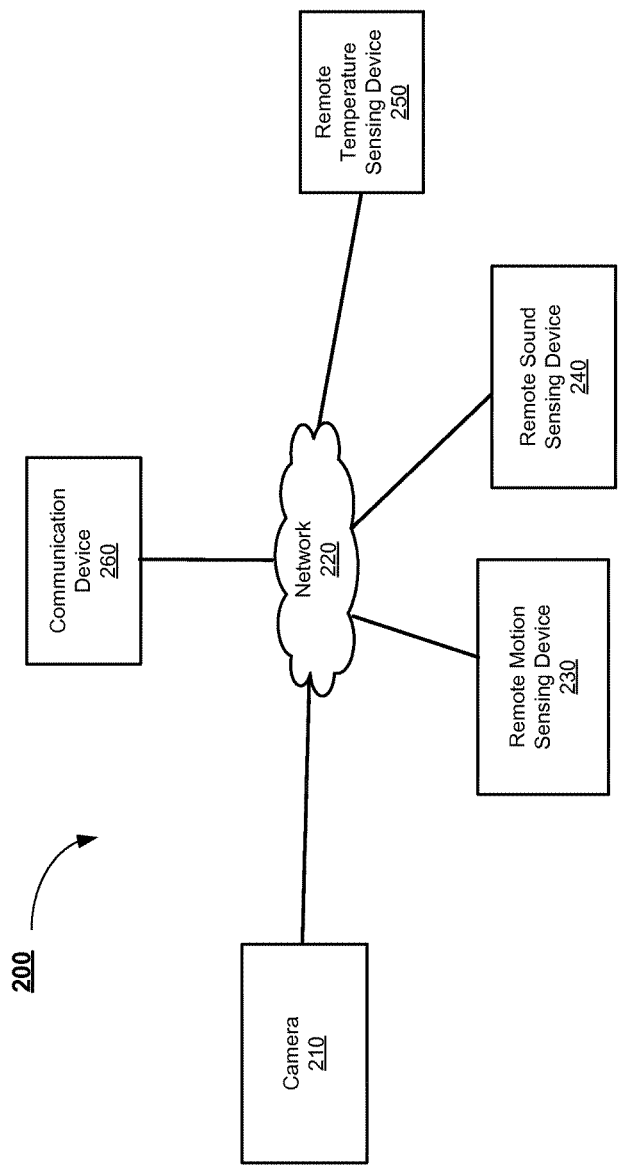
FIG. 4 is a schematic illustration of the different components of an example camera control system.

FIG. 4 illustrates different components of an example camera control system 200. The camera control system 200 includes a camera 210, a network 220, a remote motion sensing device 230, a remote sound sensing device 240, a remote temperature sensing device 250, and a communication device 260. The camera control system 200 is a system for controlling the movements of the camera 210 by reorienting the camera 210 in response to discrete information obtained from the remote sensing devices 230-250 so that the camera 210 can capture video images of events of potential interest to a user. The camera 210 can be, for example, a pan and tilt camera that can be positioned and/or oriented based on the particular set of data received from one or more of the remote sensing devices 230-250. FIG. 4 shows the camera 210 to be operatively coupled to three remote sensing devices 230-250 and one communication device 260 as an example only, and not a limitation. In other configurations, the camera 210 can be operatively coupled to more than one communication device 260 and more than three or less than three remote sensing devices 230-250.

The communication device 260 can be, for example, a server, a desktop computer, a laptop computer, a tablet, a smartphone, and/or the like. The communication device 260 can send data and/or receive data from the camera 210 and the different remote sensing devices 230-250 using a variety of wireless communication protocols, such as, for example, a Wi-Fi® protocol, a Worldwide Interoperability for Microwave Access (WiMAX) protocol, a Bluetooth low energy technology (BTLE) protocol, a cellular protocol (e.g., a third generation mobile telecommunications (3G) or a fourth generation mobile telecommunications (4G) protocol), 4G long term evolution (4G LTE) protocol), and/or the like.

The network 220 can be any type of network (e.g., a local area network (LAN), a wide area network (WAN), a virtual network, and/or a telecommunications network) implemented as a wired network and/or a wireless network and can include an intranet, an Internet Service Provider (ISP) and the Internet, a cellular network, and/or the like. The remote motion sensing device 230 can detect the motion of objects and people in a pre-defined area and can alert or send a signal to the communication device 260 and/or the camera 210 to notify the user of the motion in the pre-defined area. The remote motion sensing device 230 can be, for example, a passive infrared (PIR) motion detector, a microwave motion detector, an ultrasonic motion detector, a Tomographic motion detector, and/or the like. The remote motion sensing device 230 can be a battery-operated sensor that can operate on, for example, Wi-Fi® technology and can be placed in various areas an environment (e.g., a home, an office, a school, etc.). The remote motion sensing device 230 sends a signal to the communication device 260 and/or the camera 210 to notify the user of movements of objects and/or people in the pre-defined area.

The remote sound sensing device 240 can detect sound strength in a pre-defined region around the remote sound sensing device 240 and can include a microphone and associated electronics to amplify and/or filter the detected sound signal. The remote sound sensing device 240 can be a battery-operated sensor that can operate on, for example, Wi-Fi® technology and can be placed in various areas an environment (e.g., a home, an office, a school, etc.). The remote sound sensing device 240 can send a signal to the communication device 260 and/or the camera 210 to notify the user of the sound levels in the pre-defined area.

The remote temperature sensing device 250 can be any analog and/or digital temperature sensor, such as, for example, infra-red (IR) thermopile temperature sensors, thermocouples, silicon bandgap temperature sensors, resistance temperature detectors (RTDs), and/or the like. The remote temperature sensing device 250 can be a battery-operated sensor that can operate on, for example, Wi-Fi® technology and can be placed in various areas in an environment (e.g., a home, an office, a school, etc.). The camera 210 can communicate with the remote sensing devices 230-250 using any of the wireless protocols described above to receive motion data, sound data and/or temperature data, respectively. Upon detection of the temperature levels, the sound level and the motion information in the vicinity of the different remote sensing devices 230-250, the orientation of the camera 210 can be adjusted or altered to point the camera 210 in the direction of the different remote sensing devices 230-250 for capturing video images(s) of events of potential interest to the user.

In some implementations, the camera control system 200 can include one or multiple differential radio antennae that are either attached to the body of the camera 210 or are remote from the camera 210 and can be operably coupled to the camera 210 via the wireless technologies described above. In such implementations, the signals received by the camera 210 from such differential radio antennae can be transmitted to the communication device 260 for further processing. Using such signals, a camera control application (e.g., the control "software") can triangulate the direction and/or the angle of the radio (or wireless) transmission from the different remote sensing devices 230-250. In some instances, the camera control application can be executing in the communication device 260, and in other instances, the camera control application can be executing in the camera 210. The camera control application can then calculate the degrees of change of angle of view of the camera 210 from its current position (or a pre-defined home position) that is needed for aiming the camera 210 towards the direction of the remote sensing devices 230-250.

In such implementations, two or more differential radio antennae may be required to accurately calculate the timing differences in reception of a given signal from the remote sensing device 230-250. In some instances, when three differential antennae are present, accurate determination of the direction of the remote sensing device 230-250 can be made at any angle around the camera 210. In such instances, one of the antenna is at a different height when compared to the other two antennas, and thus the vertical angle of the remote sensing device 230-250 can also be determined with accuracy. In such implementations, any of the remote sensing devices 230-250 can send a signal to the camera 210 indicating that an event of interest had occurred, and can then transmit a series of signals interpretable by the camera 210 (e.g., the camera control application) as direction finding signals. The camera 210 can then be re-oriented in the direction of interest and can capture video data of an event of potential interest to a user.

In other implementations, the camera control system 200 can include a directional antenna located inside of a movable portion of the camera 210. In such implementations, the camera 210 can scan its environment by rotating the appropriate section containing the directional antenna while scanning or "listening" for source signals from the different remote sensing devices 230-250. Such source signals can include an identifier for the remote sensing device 230-250 (e.g., an IP address of the remote sensing device 230-250). In the area of a received signal, the camera 210 can record the signal strength and the direction of the signal based upon deviation from a pre-defined home position in degrees. The home position can be a set of co-ordinates used to define relative movements of the camera 210. The co-ordinates of the home position can change, however, if the camera 210 is, for example, manually moved from a first geographic location to a second geographic location. Once the signal data from the remote sensing devices 230-250 are collected, the camera 210 can detect and record the specific location of each remote sensing device 230-250 and the precise location of the greatest signal strength. When the camera 210 subsequently receives notification of an event from a particular remote sensing device 230-250 (that is included its list of "visible" remote sensing device 230-250), the camera 210 can be automatically re-oriented to the desired direction.

In yet other implementations, setup of the camera control system 200 involves a user first placing the camera 210 in a fixed location, followed by a user placing the different remote sensing device(s) 230-250 in locations of interest within view of the camera 210, and then the user manually reorienting the camera 210 such that the view angle of the camera 210 is aimed toward the remote sensing device or any related object of interest. This is followed by the camera control application recording the location and orientation of the camera 210 as a set pre-defined view angle. In such implementations, subsequently, when the remote sensing device (either 230 or 240 or 250) sends a signal to the camera 210 or sends a signal to a related home automation system that in turn sends the signal to the camera 210, the camera 210 can be reoriented to the area of interest and can capture video signals of potential events of interest.

In some implementations, with respect to sound signals, the camera 210 can be constructed in such a manner as to include multiple microphones (e.g., three microphones) such that given the sound wave propagation timing differences of sounds arriving at the differential microphones, the direction and angle of the source of the sound signal (or sound wave) can be triangulated. The cameral control application (e.g., executing on either the camera 210 or the communication device 260) can calculate the desired change in the view angle from the current position of the camera 210 (or with respect to the home position) to aim the camera 210 in the direction of the sound so that the camera 210 can capture video signals of potential events of interest.

In some implementations, the camera control system 200 coordinates pan and tilt of multiple cameras based on priority schemes. In these implementations, multiple sensors may trigger at a particular time (or within a relatively short time window, such as within one second) and the camera control system 200 evaluates the priority schemes to coordinate movement of the multiple cameras in a manner that best captures the multiple potential events of interest in accordance with the priority schemes. For instance, the priority schemes may define a ranked list of sensor triggers and the camera control system 200 coordinates movement of the multiple cameras based on the ranked list. In this regard, if a camera detects multiple sensor triggers in different locations, the camera reorients toward the sensor trigger ranked highest in the ranked list of sensor triggers, even it that results in moving away from a lower ranked event of potential interest. Also, the camera control system 200 may identify, from among the multiple cameras, a first camera with the best view of the highest ranked sensor trigger and, based on the identification, control the first camera to pan and/or tilt toward the highest ranked sensor trigger. Then, the camera control system 200 may identify, from among the multiple cameras other than the first camera, a second camera with the best view of the next ranked sensor trigger and, based on the identification, control the second camera to pan and/or tilt toward the next ranked sensor trigger while the first camera captures images of a location of the highest ranked sensor trigger. In this case, the second camera is used for the lower ranked sensor trigger, even if the first camera has a better view of the next ranked sensor trigger than the second camera.

The priority schemes may account for any variables described throughout this disclosure including the types of sensor triggers, the locations of the sensor triggers relative to the cameras, the quality of the cameras, the field of view of the cameras, image quality, etc. For example, multiple cameras may be oriented toward the same location if the locations of the sensor triggers are relatively close together. Also, a higher quality camera may be oriented toward a higher ranked sensor trigger, even if a lower quality camera is closer to and has a better field of view of the higher ranked sensor trigger. Further, a sensor trigger may be ignored if none of the cameras are able to capture an area of the sensor trigger in sufficient detail. In this case, multiple cameras may orient toward a single event, rather than attempting to cover all of the events.

The priority schemes also may account for different times of day (or days of the week) and/or different alarm states of a security system at a property. For example, a sensor related to movement of a pet may be prioritized over a sensor related to a safe based on the time of day being between eight in the morning and eight in the evening and the security system being disarmed and the sensor related to the safe may be prioritized over the sensor related to movement of the pet based on the time of day being between eight in the evening and midnight and the security system being armed—away.

In some examples, the camera control system 200 may anticipate potential events of interest and use the anticipated events to control camera movement. In these examples, the camera control system 200 may have a set of anticipated potential events that occur shortly after another potential event of interest. For example, if an intruder enters through a window, the intruder is expected to leave through the back door. In this example, the camera control system 200 defines an anticipated event of back door exit that is anticipated to occur after detection of a window opening or breaking and control one or more cameras to orient to the back door based on detection of a window or glass break sensor indicating that the window has been opened or broken. The camera control system 200 may track potential events of interest over time and derive anticipated events based on the tracking.

In some implementations, the camera control system 200 may account for image processing in coordinating camera movement. In these implementations, the images captured by cameras in the camera control system 200 may be analyzed in real-time (or near real-time) and the image analysis may be used to control movement of the cameras. For example, the image analysis may include analyzing the captured images to determine whether the view of the camera is obstructed and/or whether the camera captures images of an object of potential interest. In this example, the image analysis may capture the current images to background images to identify obstructions and/or objects of potential interest and/or may analyze the images for moving objects and/or objects having a size and shape of an object of potential interest (e.g., the size and shape of a human body). The camera control system 200 may react based on the image analysis in an attempt to best capture events of potential interest. For instance, the camera control system 200 may control a camera to pan to a different area if its' view is obstructed and may maintain a camera's field of view if an object of potential interest remains in the captured images.

In some examples, cameras may include a default setting that is invoked based on a sensor trigger not being found. For instance, a camera may not be able to find a location of a sensor because of a sensor malfunction or the sensor being destroyed. In this case, the camera may enter a default mode in which it begins uploading images and periodically pans and/or tilts throughout its full range of motion.

The camera control system 200 also may include exterior cameras that are located exterior to a property. In this case, the camera control system 200 may control the exterior cameras in the same manner as interior cameras and coordinate the movement of the exterior cameras with the interior cameras. For instance, the camera control system 200 may detect a side door being opened and then control the exterior cameras to image an area of the side door and/or an area of anticipated movement from the side door.

Figure 5:
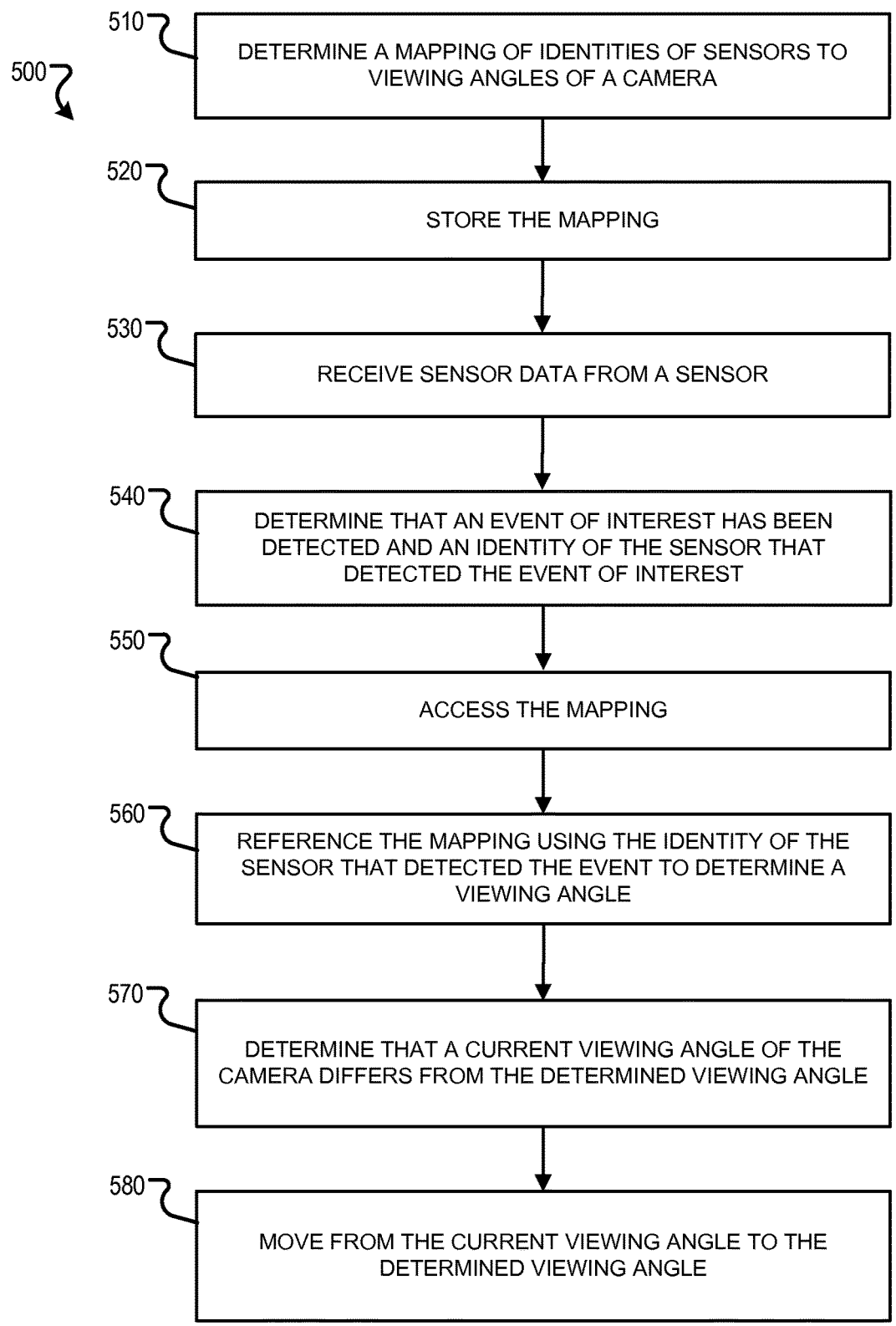
FIG. 5 is a flow chart of an example process.

FIG. 5 illustrates an example process 500 for controlling a camera. The operations of process 500 are generally described as being performed by the camera 210. In some implementations, operations of the process 500 may be performed by one or more processors included in one or more electronic devices, e.g., the communication device 260.

The camera 210 determines a mapping of identities of sensors to viewing angles of the camera 210 (510). The camera 210 may associate each sensor with a unique identifier, e.g., unique a media control access (MAC) address or Internet Protocol (IP) address for each sensor, and associate each of the unique identifiers with a particular viewing angle. For example, for a motion sensor directly in front of the camera 210 and a sound sensing sensor behind and below the camera 210, the camera 210 may associate a unique identifier of "04AE" with the motion sensor and associate a viewing angle of zero degrees tilt and zero degrees turn with the motion sensor and associate a unique identifier of "04AF" with the sound sensing sensor and associate a viewing angle of ten degrees tilt downwards and one hundred eighty degrees turn with the sound sensing sensor.

The camera 210 may determine the mapping of identities of sensors to viewing angles of the camera 210 based on determining a location of each of the sensors and corresponding identifiers, determining a viewing angle associated with each of the locations, and generating for each of the sensors, a mapping between the identity of the sensor and the determined viewing angle. For example, the camera 210 may determine that the remote motion sensing device 230 is directly in front of the camera 210 and has a unique identifier of "04AE," determine that the remote sound sensing device 240 is behind and below the camera 210 and has a unique identifier of "04AF," determine that a viewing angle associated with a location directly in front of the camera 210 is associated with zero degrees tilt and zero degrees turn, and determine that a viewing angle associated with a location behind and below the camera 210 is associated with a ten degree tilt downwards and a one hundred eighty degree turn, and generate a table indicating that the unique identifier "04AE" maps to a viewing angle of zero degrees tilt and zero degrees turn and the unique identifier "04AF" maps to a viewing angle of ten degree tilt downwards and one hundred eighty degree turn.

In some implementations, the unique identifiers of the sensors may be constant values that are stored by the sensors and provided by the sensors to the camera 210 in response to a request from the camera 210 for identifiers of sensors. In other implementations, the unique identifiers of the sensors may be uniquely assigned by the camera 210 in response to the sensors indicating their presence to the camera 210.

In some implementations, the camera 210 may determine the location of each of the sensors using two or more differential radio antennae and one or more signals from the sensor. The camera 210 may determine the location of each of the sensors relative to the camera 210 based on timing differences when a particular signal is received by the two or more differential radio antenna. For example, as described above in regards to FIG. 4, the camera 210 may determine that the remote motion sensing device 230 is directly in front and level to the camera 210 based on determining that antennae at the top and bottom of the camera 210 sensed a signal at the same time, antennae at the left and right of the camera 210 sensed the signal at the same time, and an antenna at the front of the camera 210 sensed the signal before an antennae at the back of the camera 210.

In other implementations, the camera 210 may determine a location of each of the sensors based on determining a direction of the sensor relative to the camera 210 based on a strength of one or more signals from the sensor measured by a directional antenna. For example, as described above in regards to FIG. 4, the camera 210 may determine that a signal from the remote motion sensing device 230 that is directly in front and level with the camera 210 is strongest when a directional antenna of the camera 210 is facing directly forward and level to the ground.

The camera 210 may store the mapping (520). In particular, the camera 210 may store the mapping of identities of sensors to viewing angles of the camera 210. For example, the camera 210 may store a generated table that indicates that the unique identifier "04AE" maps to a viewing angle of zero degrees tilt and zero degrees turn and the unique identifier "04AF" maps to a viewing angle of ten degree tilt downwards and one hundred eighty degree turn.

The camera 210 may receive sensor data from a sensor (530). For example, the camera 210 may receive sensor data from the remote motion sensing device 230 that indicates that motion has been detected and the unique identifier of the sensor providing the sensor data is "04AE."

The camera 210 determines that an event of interest has been detected and an identity of the sensor that detected the event of interest (540). For example, the camera 210 may determine that sensor data from the remote motion sensing device 230 indicates a unique identifier of "04AE" and movement for a duration of two seconds that is great than a threshold duration of one second, and in response, the camera 210 may determine that an event of interest has been detected by a sensor with the unique identifier of "04AE."

In response to determining an event of interest has been detected and an identity of a sensor that detected the event of interest, the camera 210 may access the mapping of identities of sensors to viewing angles of the camera 210 that is stored by the camera 210 (550). For example, in response to determining that the sensor with the unique identifier of "04AE" has detected an event of interest, the camera 210 may access a stored mapping including a mapping for the identifier "04AE."

The camera 210 references the accessed mapping using the identity of the sensor that detected the event of interest to obtain a viewing angle of the camera 210 appropriate for an area of the property associated with the sensor that detected the event of interest (560). For example, the camera 210 may reference the accessed mapping using the unique identifier "04AE" which is mapped to a viewing angle of zero degrees turn and zero degrees tilt, and in response, obtain a viewing angle of zero degrees turn and zero degrees tilt.

The camera 210 determines that a current viewing angle of the camera 210 differs from the viewing angle of the camera 210 appropriate for the area of the property associated with the sensor that detected the event of interest (570). For example, the camera 210 may determine that a current viewing angle of the camera 210 is ninety degrees to the right and five degrees up and the current viewing angle is different than a viewing angle of zero degrees turn and zero degrees tilt that is appropriate for the area of the property associated with the sensor with the unique identifier "04AE" that detected the event of interest.

In response to determining a difference in the viewing angles, the camera 210 moves from the current viewing angle to the viewing angle of the camera 210 appropriate for the area of the property associated with the sensor that detected the event of interest (580). For example, the camera 210 may move from a current viewing angle of ninety degrees to the right and five degrees up to zero degrees turn and zero degrees tilt. In response to determining no difference in the viewing angles, the camera 210 may not move.

In some implementations, after moving, the camera 210 may provide one or more images with the viewing angle that is appropriate for the area of the property associated with the sensor that detected the event of interest. In some implementations, the camera 210 may receive sensor data from multiple sensors and detect multiple events of interests from the sensor data, and in response, determine whether to move a viewing angle of the camera 210 based on a priority scheme. As described above in reference to FIG. 4, in some implementations, the priority scheme may be based on one or more of time of day, quality of the camera 210, availability of other cameras, or location of the sensor relative to the camera 210.

As described above in reference to FIG. 4, in some implementations, the camera 210 may determine an anticipated event based on the sensor data, determine a location that maps to the anticipated event, determine a viewing angle of the camera 210 that maps to the location that maps to the anticipated event, and cause the viewing angle of the camera 210 to move to the viewing angle of the camera 210 that maps to the location that maps to the anticipated event. For example, the camera 210 may determine that a sensor data from a front door sensor indicates that a front door has opened, an anticipated event is that motion will be detected in a foyer, determine a viewing angle of the camera 210 for the foyer, and cause the viewing angle of the camera 210 to move to the viewing angle of the camera 210 corresponding to the foyer.

In some implementations, the camera 210 may change a viewing angle of the camera 210 based on determining from images captured by the camera 210 that a view of the camera 210 is obstructed. For example, as described above in reference to FIG. 4, the camera 210 may identify a moving object of interest in images, determine that the object is obstructed, and move the viewing angle of the camera 210 based on the obstruction.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A computer-implemented method comprising:
    determining, by a camera located in a monitored property, a mapping of identities of sensors to viewing angles of the camera, the sensors being located in the monitored property at locations remote from a location of the camera;

storing, by the camera and in electronic storage accessible to the camera, the mapping of identities of sensors to viewing angles of the camera;

after storing the mapping of identities of sensors to viewing angles of the camera, receiving, by the camera, sensor data from at least one of the sensors that are located in the monitored property at locations remote from the location of the camera;

determining, from the received sensor data and by the camera, that an event of interest has been detected and an identity of a sensor that detected the event of interest;

in response to determining that the event of interest has occurred:
  accessing, by the camera and from the electronic storage accessible to the camera, the mapping of identities of sensors to viewing angles of the camera;
  referencing, by the camera, the accessed mapping using the identity of the sensor that detected the event of interest to obtain a viewing angle of the camera appropriate for an area of the property associated with the sensor that detected the event of interest;
  determining, by the camera, that a current viewing angle of the camera differs from the viewing angle of the camera appropriate for the area of the property associated with the sensor that detected the event of interest; and
  moving, by the camera, from the current viewing angle to the viewing angle of the camera appropriate for the area of the property associated with the sensor that detected the event of interest.

2. The method of claim 1, comprising:
providing one or more images from the camera when the current viewing angle of the camera matches the viewing angle of the camera appropriate for the area of the property associated with the sensor that detected the event of interest.

3. The method of claim 1, wherein sensor data includes information that uniquely identifies the sensor that detected the event of interest from other sensors that are located in the monitored property and information that indicates that the sensor has detected the event of interest.

4. The method of claim 1, wherein determining, by a camera located in a monitored property, a mapping of identities of sensors to viewing angles of the camera, the sensors being located in the monitored property at locations remote from a location of the camera comprises:
for each of the sensors located in the monitored property, determining a location of the sensor;
for each location of a sensor, determining a viewing angle of the camera that maps to the location of the sensor; and
generating for each of the sensors located in the monitored property, a mapping between an identify of the sensor and the viewing angle determined for the location of the sensor.

5. The method of claim 4, wherein determining a location of the sensor comprises:
determining the location of the sensor relative to the camera using two or more differential radio antennae and one or more signals from the sensor.

6. The method of claim 5, wherein determining the location of the sensor relative to the camera using two or more differential radio antennae and one or more signals from the sensor comprises:
determining the location of the sensor relative to the camera based on timing differences when a particular signal is received by the two or more differential radio antennae.

7. The method of claim 4, wherein determining a location of the sensor comprises:
determining a direction of the sensor relative to the camera based on a strength of one or more signal from the sensor measured by a directional antenna.

8. The method of claim 1, wherein the sensors comprise one or more of a temperature sensor, a motion sensor, or sound sensor.

9. The method of claim 1, wherein moving, by the camera, from the current viewing angle to the viewing angle of the camera appropriate for the area of the property associated with the sensor that detected the event of interest comprises:
providing instructions to the camera to one or more of pan or tilt so that the viewing angle of the camera matches the viewing angle of the camera appropriate for the area of the property associated with the sensor that detected the event of interest.

10. The method of claim 1, comprising:
receiving sensor data from a second sensor that is located in the monitored property at a location remote from the location of the camera;
determining from the sensor data from the second sensor that a second event of interest has been detected and an identity of the second sensor that detected the second event of interest; and
in response to determining that the event of interest and the second event of interest have both been detected, determining to access a priority scheme to select which of the first sensor and the second sensor to cause the camera to move so that the viewing angle of the camera moves to the viewing angle mapped to the identity of the selected sensor.

11. The method of claim 10, wherein the priority scheme is based on one or more of time of day, quality of the camera, availability of other cameras, or location of the sensor relative to the camera.

12. The method of claim 1, comprising:
determining an anticipated event based on the sensor data;
determining a location that maps to the anticipated event;
determining a viewing angle of the camera that maps to the location that maps to the anticipated event; and
causing the viewing angle of the camera to move to the viewing angle of the camera that maps to the location that maps to the anticipated event.

13. The method of claim 1, comprising:
determining from images captured by the camera that a view of the camera is obstructed; and
in response to determining from images captured by the camera that a view of the camera is obstructed, changing a viewing angle of the camera.

14. A system comprising:
one or more computers and one or more storage devices storing instructions that are operable, when executed by the one or more computers, to cause the one or more computers to perform operations comprising:
  determining, by a camera located in a monitored property, a mapping of identities of sensors to viewing angles of the camera, the sensors being located in the monitored property at locations remote from a location of the camera;
  storing, by the camera and in electronic storage accessible to the camera, the mapping of identities of sensors to viewing angles of the camera;

after storing the mapping of identifies of sensors to viewing angles of the camera, receiving, by the camera, sensor data from at least one of the sensors that are located in the monitored property at locations remote from the location of the camera;

determining, from the received sensor data and by the camera, that an event of interest has been detected and an identity of a sensor that detected the event of interest;

in response to determining that the event of interest has occurred:
   accessing, by the camera and from the electronic storage accessible to the camera, the mapping of identities of sensors to viewing angles of the camera;
   referencing, by the camera, the accessed mapping using the identity of the sensor that detected the event of interest to obtain a viewing angle of the camera appropriate for an area of the property associated with the sensor that detected the event of interest;
   determining, by the camera, that a current viewing angle of the camera differs from the viewing angle of the camera appropriate for the area of the property associated with the sensor that detected the event of interest; and
   moving, by the camera, from the current viewing angle to the viewing angle of the camera appropriate for the area of the property associated with the sensor that detected the event of interest.

15. The system of claim 14, comprising:
providing one or more images from the camera when the current viewing angle of the camera matches the viewing angle of the camera appropriate for the area of the property associated with the sensor that detected the event of interest.

16. The system of claim 14, wherein sensor data includes information that uniquely identifies the sensor that detected the event of interest from other sensors that are located in the monitored property and information that indicates that the sensor has detected the event of interest.

17. The system of claim 14, wherein determining, by a camera located in a monitored property, a mapping of identities of sensors to viewing angles of the camera, the sensors being located in the monitored property at locations remote from a location of the camera comprises:
   for each of the sensors located in the monitored property, determining a location of the sensor;
   for each location of a sensor, determining a viewing angle of the camera that maps to the location of the sensor; and
   generating for each of the sensors located in the monitored property, a mapping between an identify of the sensor and the viewing angle determined for the location of the sensor.

18. The system of claim 17, wherein determining a location of the sensor comprises:
   determining the location of the sensor relative to the camera using two or more differential radio antennae and one or more signals from the sensor.

19. The system of claim 18, wherein determining the location of the sensor relative to the camera using two or more differential radio antennae and one or more signals from the sensor comprises:
   determining the location of the sensor relative to the camera based on timing differences when a particular signal is received by the two or more differential radio antennae.

20. A non-transitory computer-readable medium storing software comprising instructions executable by one or more computers which, upon such execution, cause the one or more computers to perform operations comprising:
   determining, by a camera located in a monitored property, a mapping of identities of sensors to viewing angles of the camera, the sensors being located in the monitored property at locations remote from a location of the camera;
   storing, by the camera and in electronic storage accessible to the camera, the mapping of identities of sensors to viewing angles of the camera;
   after storing the mapping of identifies of sensors to viewing angles of the camera, receiving, by the camera, sensor data from at least one of the sensors that are located in the monitored property at locations remote from the location of the camera;
   determining, from the received sensor data and by the camera, that an event of interest has been detected and an identity of a sensor that detected the event of interest;
   in response to determining that the event of interest has occurred:
      accessing, by the camera and from the electronic storage accessible to the camera, the mapping of identities of sensors to viewing angles of the camera;
      referencing, by the camera, the accessed mapping using the identity of the sensor that detected the event of interest to obtain a viewing angle of the camera appropriate for an area of the property associated with the sensor that detected the event of interest;
      determining, by the camera, that a current viewing angle of the camera differs from the viewing angle of the camera appropriate for the area of the property associated with the sensor that detected the event of interest; and
      moving, by the camera, from the current viewing angle to the viewing angle of the camera appropriate for the area of the property associated with the sensor that detected the event of interest.

\* \* \* \* \*